United States Patent Office 2,965,667
Patented Dec. 20, 1960

2,965,667

PHOSPHOROHYDRAZIDOTHIOATES

Henry Tolkmith, Midland, Mich., assignor to The Dow Chemical Company, Midland, Mich., a corporation of Delaware No Drawing. Filed Oct. 28, 1959, Ser. No. 849,133

7 Claims. (Cl. 260—461)

The present invention is concerned with O,O,O,O-tetramethyl cyclohexadiene-1,4-diylidine bis(phosphorohydrazidothioate), O,O,O,O-tetraethyl cyclohexadiene-1,4-diylidine bis(phosphorohydrazidothioate) and the phosphorohydrazidothioates corresponding to the formula

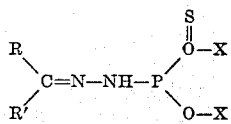

In this and succeeding formulae, R represents phenyl or halophenyl, R' represents hydrogen, lower alkyl, phenyl or halophenyl and each X represents lower alkyl. The term lower alkyl is employed in the present specification and claims to refer to the alkyl radicals containing from 1–5 carbon atoms, inclusive. These new compounds are liquid or crystalline solid materials which are somewhat soluble in many organic solvents and of low solubility in water. They are useful as intermediates for the preparation of more complex organic derivatives. The compounds are also useful as parasiticides and are adapted to be employed as active toxic constituents of compositions for the control of mite, insect and bacterial organisms such as flies, southern army worms and aphids.

The new compounds may be prepared by reacting an O,O-(di-lower alkyl) phosphorohydrazidothioate with benzoquinone, or with a mono-aldehyde or mono-ketone corresponding to the formula

The reaction preferably is carried out in an organic liquid as reaction medium. Good results are obtained when employing stoichiometric proportions of the reagents. The reaction is somewhat exothermic, and takes place smoothly at temperatures of from 0° to 100° C. with the formation of the desired product and water of reaction. The temperature may be controlled by regulating the rate of contacting the reactants and by external cooling.

In carrying out the reaction, the benzoquinone, monoaldehyde or mono-ketone and the O,O-(di-lower alkyl) phosphorohydrazidothioate are contacted and mixed together. Conveniently the mixing is carried out in a reaction medium such as an organic solvent. In either event, the mixing and contacting are carried out at a temperature of from 0° to 100° C. and conveniently at from room temperature to 50° C., and the reaction mixture maintained for a short period of time in said temperature range to complete the reaction. Upon completion of the reaction, the reaction mixture may be dried to remove water of reaction, and reaction medium be removed by evaporation to obtain the desired product as a residue. This product may be purified by conventional means such as extraction with suitable solvents and recrystallization.

The following examples merely illustrate the invention and are not to be considered as limiting:

Example 1.—O,O-dimethyl 2-chlorobenzylidene phosphorohydrazidothioate

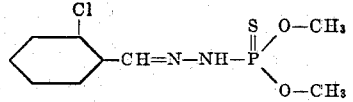

O,O-dimethyl phosphorohydrazidothioate (31 grams; 0.2 mole) was dispersed in 250 milliliters of benzene and the resulting mixture added to 29 grams (0.205 mole) of 2-chlorobenzaldehyde dispersed in 250 milliliters of benzene. The addition was carried out with stirring and at room temperature. Stirring was continued for one hour and the mixture thereafter warmed to 40° C. to evaporate off reaction solvent. The residue was then dissolved in cyclohexane, cyclohexane insolubles removed by decantation and the cyclohexane subsequently removed by evaporation. As a result of these operations, there was obtained an O,O-dimethyl 2-chlorobenzylidene phosphorohydrazidothioate product as a crystalline residue. This product had a melting point of 51°–52° C. and sulfur and chlorine contents of 11.59 percent and 12.44 percent, respectively, as compared to theoretical contents of 11.48 percent and 12.72 percent.

Example 2.—O,O-diethyl 2-chlorobenzylidene phosphorohydrazidothioate

O,O-diethyl phosphorohydrazidothioate (37 grams; 0.2 mole) was dispersed in 250 milliliters of benzene and the resulting mixture added to 29 grams (0.2 mole) of 2-chlorobenzaldehyde dispersed in 250 milliliters of benzene. The addition was carried out with stirring and at room temperature. Stirring was continued for one hour and the reaction mixture subsequently processed in the manner as described in Example 1 to obtain an O,O-diethyl 2-chlorobenzylidene phosphorohydrazidothioate product as a crystalline residue. This product has a melting point of 52°–53° C. and sulfur and chlorine contents of 10.94 percent and 11.46 percent, respectively, as compared to theoretical contents of 10.45 percent and 11.56 percent.

Example 3.—O,O-dimethyl α-methyl-4-chlorobenzylidene phosphorohydrazidothioate O,O-dimethyl phosphorohydrazidothioate (0.2 mole) was reacted with 31 grams (0.2 mole) of p-chloroacetophenone in benzene in the manner exactly as described in Example 1. As a result of these operations, there was obtained an O,O-dimethyl α-methyl-4-chlorobenzylidene phosphorohydrazidothioate product as a crystalline residue. This product had a melting point of 69°–71° C. and sulfur and chlorine contents of 10.6 percent and 11.6 percent, respectively, as compared to theoretical contents of 10.92 percent and 12.11 percent.

Example 4.—O,O-diethyl α-methyl-4-chlorobenzylidene phosphorohydrazidothioate O,O-diethyl phosphorohydrazidothioate (0.2 mole) was reacted with 0.2 mole of p-chloroacetophenone in benzene to produce an O,O-diethyl α-methyl-4-chlorobenzylidene phosphorohydrazidothioate product. The conditions of reaction and methods of separation were all those as set forth in Example 1. The desired product was obtained as a crystalline solid having a melting point of 54°–55° C. and sulfur and chlorine contents of 10.15 percent and 11.1 percent, respectively, as compared to theoretical contents of 10.05 percent and 11.05 percent.

Example 5.—O,O-dimethyl 2,3,6-trichlorobenzylidene phosphorohydrazidothioate O,O-dimethyl phosphorohydrazidothioate (15.5 grams; 0.1 mole) was dispersed in 100 milliliters of benzene and the resulting mixture added at room temperature with stirring to 21 grams (0.1 mole) of 2,3,6-trichlorobenzaldehyde dissolved in 250 milliliters of benzene. Stirring was continued for one hour and the reaction mixture thereafter warmed to 40° C. to remove reaction solvent by evaporation. Following the evaporation of the solvent, an O,O-dimethyl 2,3,6-trichlorobenzylidene phosphorohydrazidothioate product was obtained as a crystalline residue. This product had a melting point of 123°–124° C. and sulfur and chlorine contents of 9.46 percent and 30.52 percent, respectively, as compared to theoretical contents of 9.23 percent and 30.6 percent.

*Example 6.—O,O-diethyl 2,3,6-trichlorobenzylidene phosphorohydrazidothioate*

In a similar manner, O,O-diethyl phosphorohyrazidothioate (18.5 grams; 0.1 mole) was reacted in benzene with 0.1 mole of 2,3,6-trichlorobenzaldehyde. The conditions of reaction and methods of sepaartion were all as described in Example 5. As a result of these operations, there was obtained an O,O-diethyl 2,3,6-trichlorobenzylidene phosphorohydrazidothioate product as a crystalline residue. This product had a melting point of 122°–123° C. and a chlorine content of 28.11 percent as compared to a theoretical content of 28.32 percent.

*Example 7.—O,O-dimethyl pentachlorobenzylidene phosphorohydrazidothioate*

O,O-dimethyl phosphorohydrazidothioate (0.1 mole) was dispersed in 100 milliliters of benzene and the resulting product mixed with 28 grams (0.1 mole) of pentachlorobenzaldehyde dissolved in 250 milliliters of chlorobenzene. The mixing was carried out with stirring and at a temperature of 70° C. Following the mixing, the temperature of the reaction mixture was raised to the boiling point and maintained thereat for about one half hour to complete the reaction. The reaction solvent was then removed by evaporation to obtain an O,O-dimethyl pentachlorobenzylidene phosphorohydrazidothioate product as a crystalline residue. This product had a melting point of 182°–183° C. and sulfur and chlorine contents of 7.66 percent and 42.37 percent, respectively, as compared to theoretical contents of 7.70 percent and 42.56 percent.

*Example 8.—O,O-diethyl pentachlorobenzylidene phosphorohydrazidothioate*

In a similar manner, 0.1 mole of O,O-diethyl phosphorohydrazidothioate was dispersed in benzene and reacted with 0.1 mole of pentachlorobenzaldehyde dissolved in chlorobenzene. The conditions of reaction and methods of separation were all as described in Example 7. As a result of these operations, there was obtained an O,O-diethyl pentachlorobenzylidene phosphorohydrazidothioate product as a crystalline solid melting at 158°–159° C. and having a chlorine content of 39.69 percent as compared to a theoretical content of 39.88 percent.

*Example 9.—O,O-dimethyl diphenylmethylene phosphorohydrazidothioate*

O,O-dimethyl phosphorohydrazidothioate (0.2 mole) was dispersed in 250 milliliters of benzene and mixed at room temperature with stirring with 35 grams (0.192 mole) of benzophenone dispersed in 300 milliliters of benzene. Stirring was thereafter continued for one hour and the reaction mixture thereafter processed as described in Example 1 to obtain an O,O-dimethyl-diphenylmethylene phosphorohydrazidothioate product as a crystalline residue. This product had a melting point of 86°–87° C. and a sulfur content of 10.5 percent as compared to a thoretical content of 10.01 percent.

*Example 10.—O,O-diethyl diphenylmethylene phosphorohydrazidothioate*

In a similar manner, 0.2 mole of O,O-diethyl phosphorohydrazidothioate was reacted in benzene with 0.19 mole of benzophenone. The conditions of reaction and methods of separation were all as described in Example 9. As a result of these operations, there was obtained an O,O-diethyl diphenylmethylene phosphorohydrazidothioate product, melting at 65°–66° C. and having a sulfur content of 9.5 percent as compared to a theoretical content of 9.2 percent.

*Example 11.—O,O-dimethyl di-(2,5-dichlorophenyl) methylene phosphorohydrazidothioate*

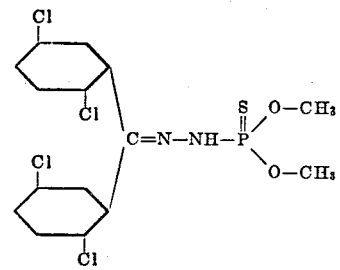

O,O-dimethyl phosphorohydrazidothioate (0.2 mole) was reacted in benzene with 32 grams (0.2 mole) of 2,2',5,5'-tetrachlorobenzophenone. The conditions of reaction and methods of separation were exactly as described in Example 1. Upon completion of these operations, there was obtained an O,O-dimethyl di-(2,5-dichlorophenyl)methylene phosphorohydrazidothioate product as a crystalline solid melting at 123°–124° C. and having sulfur and chlorine contents of 6.92 percent and 30.4 percent, respectively, as compared to theoretical contents of 7.0 percent and 30.96 percent.

*Example 12.—O,O,O,O-tetramethyl cyclohexadiene-1,4-diylidene bis(phosphorohydrazidothioate)*

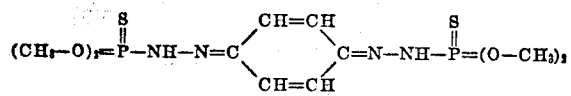

p-Benzoquinone (27 grams; 0.25 mole) was dispersed in 1000 milliliters of benzene and the resulting mixture added portionwise to 78 grams (0.5 mole) of O,O-dimethyl phosphorohydrazidothioate dispersed in 500 milliliters of benzene. The addition was carried out with stirring and over a period of about one hour. Following the addition, the solvent was removed by evaporation and the residue dispersed in one liter of ethanol. The ethanol was then removed by evaporation to obtain an O,O,O,O-tetramethyl cyclohexadiene-1,4-diylidene bis-(phosphorohydrazidothioate) product as a crystalline residue. This product was recrystallized from diethyl ether and found to melt at 138°–139° C. and have nitrogen, phosphorus and sulfur contents of 14.41 percent, 16.6 percent and 17.0 percent, respectively, as compared to theoretical contents of 14.5 percent, 16.1 percent and 17.0 percent.

*Example 13.—O,O,O,O-tetraethyl cyclohexadiene-1,4-diylidene bis(phosphorohydrazidothioate)*

In a similar manner, 0.25 mole of p-benzoquinone was reacted in benzene with 0.5 mole of O,O-diethyl phosphorohydrazidothioate. The conditions of reaction and methods of separation were all as described in the preceding example. As a result of these operations, there was obtained an O,O,O,O-tetraethyl cyclohexadiene-1,4-diylidene bis(phosphorohydrazidothioate) product as an oily liquid. O,O,O,O-tetraethyl cyclohexadiene-1,4-diylidene bis(phosphorohydrazidothioate) as a molecular weight of 440.

In a similar manner, other phosphorohydrazidothioates may be prepared as follows:

O,O-dibutyl α-ethylbenzylidene phosphorohydrazidothioate by reacting O,O-dibutyl phosphorohydrazidothioate with propiophenone.

O-methyl O-amyl α-amyl-4-chlorobenzylidene phosphorohydrazidothioate by reacting O-methyl O-amyl phosphorohydrazidothioate with p-chlorovalerophenone.

O-methyl O-amyl di-(2,3,5-trichlorophenyl) methylene phosphorohydrazidothioate by reacting O-methyl O-amyl phosphorohydrazidothioate with 2,2',3,3',5,5'-hexachlorobenzophenone.

O-methyl O-propyl benzylidene phosphorohydrazidothioate by reacting O-methyl O-propyl phosphorohydrazidothioate with benzaldehyde.

O,O - dimethyl α - phenyl-2,4-dichlorobenzylidene phosphorohydrazidothioate by reacting O,O - dimethyl phosphorohydrazidothioate with 2,4-dichlorobenzophenone.

O,O-dimethyl α(4-chlorophenyl)-2,4,5-dichlorobenzylidene phosphorohydrazidothioate by reacting O,O-dimethyl phosphorohydrazidothioate with 2,4,4',5 - tetrachlorobenzophenone.

The new compounds of the present invention are effective as parasiticides and are adapted to be employed for the control of many bacterial and insect organisms. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constitutents of oil-in-water emulsions or water dispersions with or without the addition of surface active dispersing agents. In representative operations, 100 percent controls of flies and Mexican bean beetles are obtained with aqueous compositions containing 500 parts by weight of O,O-dimethyl 2-chlorobenzylidene phosphorohydrazidothioate per million parts by weight of ultimate composition.

The O,O-(di-lower alkyl) phosphorohydrazidothioates employed as starting materials as herein described may be prepared by reacting hydrazine hydrate with a suitable O,O-(di-lower alkyl) phosphorochloridothioate in the presence of an organic liquid as reaction medium. The reaction takes place smoothly at temperatures of from 0° to 50° C. with the production of the desired product and hydrazine hydrochloride. Upon completion of the reaction, the desired product may be separated by conventional methods.

The halobenzophenones and halophenyl alkyl ketones as herein employed may be prepared by a Friedel-Crafts Reaction wherein a halobenzoic acid halide or alkanoic acid chloride is reacted with a halobenzene in the presence of aluminum chloride.

I claim:

1. A phosphorohydrazidothioate corresponding to the formula

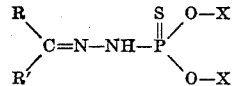

wherein R represents a member of the group consisting of phenyl and chlorophenyl, R' represents a member of the group consisting of hydrogen, lower-alkyl, phenyl and chlorophenyl and each X represents lower-alkyl.

2. O,O,O,O - tetramethyl cyclohexadiene - 1,4 - diylidene bis(phosphorohydrazidothioate).

3. O,O,O,O-tetraethyl cyclohexadiene - 1,4 - diylidene bis(phosphorohydrazidothioate).

4. O,O-dimethyl 2 - chlorobenzylidene phosphorohydrazidothioate.

5. O,O-diethyl α - methyl - 4 - chlorobenzylidene phosphorohydrazidothioate.

6. O,O - dimethyl 2,3,6 - trichlorobenzylidene phosphorohydrazidothioate.

7. O,O - dimethyl di-(2,5 - dichlorophenyl) methylene phosphorohydrazidothioate.

No references cited.

UNITED STATES PATENT OFFICE
CERTIFICATION OF CORRECTION

Patent No. 2,965,667                                  December 20, 1960

Henry Tolkmith

It is hereby certified that error appears in the above numbered patent requiring correction and that the said Letters Patent should read as corrected below.

Column 1, lines 20 to 24, the right-hand portion of the formula should appear as shown below instead of as in the patent:

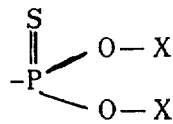

column 3, line 20, for "sepaartion" read -- separation --.

Signed and sealed this 11th day of July 1961.

(SEAL)
Attest:

ERNEST W. SWIDER                                  DAVID L. LADD

Attesting Officer                                       Commissioner of Patents